United States Patent [19]

Fujita

[11] E Re. 29,720

[45] Reissued Aug. 8, 1978

[54] TIME CORRECTING APPARATUS FOR AN ELECTRONIC TIMEPIECE

[75] Inventor: Kinji Fujita, Shimosuwa, Japan

[73] Assignee: Kabushiki Kaisha Suwa Seikosha, Tokyo, Japan

[21] Appl. No.: 686,426

[22] Filed: May 14, 1976

Related U.S. Patent Documents

Reissue of:

[64] Patent No.: 3,810,356
Issued: May 14, 1974
Appl. No.: 351,943
Filed: Apr. 17, 1973

[30] Foreign Application Priority Data

Apr. 17, 1972 [JP] Japan ..... 47-38529

[51] Int. Cl.[2] ..... G04C 3/00
[52] U.S. Cl. ..... 58/23 R; 58/85.5
[58] Field of Search ..... 58/4 A, 23 R, 50 R, 58/85.5; 235/92 T

[56] References Cited

U.S. PATENT DOCUMENTS

| | | | |
|---|---|---|---|
| 3,576,099 | 4/1971 | Walton | 58/23 R |
| 3,672,155 | 6/1972 | Bergey et al. | 58/50 R |
| 3,699,763 | 10/1972 | Zeph | 58/23 R |
| 3,717,990 | 2/1973 | Fujita | 58/50 R |
| 3,721,084 | 3/1973 | Dargent | 235/92 T X |
| 3,733,810 | 5/1973 | Girard | 58/50 R X |
| 3,823,545 | 7/1974 | Vittoz et al. | 58/85.5 X |
| 3,834,152 | 9/1974 | Nishimura et al. | 58/85.5 X |
| 3,852,950 | 12/1974 | Yoda et al. | 58/4 A |

*Primary Examiner*—Ulysses Weldon
*Attorney, Agent, or Firm*—Blum, Moscovitz, Friedman & Kaplan

[57] ABSTRACT

A time correcting apparatus for an electronic time-piece having a digital time display including a selecting switch for selecting the digit of the display to be corrected, which digit is visually identified, and a correcting switch for correcting that digit. Time correction is achieved by the combined operation of the two switches.

12 Claims, 4 Drawing Figures

TIME CORRECTING APPARATUS FOR AN ELECTRONIC TIMEPIECE

Matter enclosed in heavy brackets [ ] appears in the original patent but forms no part of this reissue specification; matter printed in italics indicates the additions made by reissue.

BACKGROUND OF THE INVENTION

This invention relates to electronic timepieces, and in particular, to electronic timepieces provided with a digital time indication formed from a liquid crystal display, a light emitting diode display or the like.

In the art, separate correcting switches are generally provided for each digit to be corrected, an arrangement which occupies a great deal of the limited space available in a small electronic timepiece such as a wrist watch, as well as being costly. By providing an arrangement wherein a plurality of digits of time display may be corrected by means of two switches, the foregoing deficiencies are avoided.

SUMMARY OF THE INVENTION

Generally speaking, in accordance with the invention, an electronic timepiece having a multi-digit digital display of time is provided with time correcting circuit means including a manually operable selecting switch and a manually operable correcting switch. Said circuit means is adapted to select at least one of said digits of time for correction in response to the operation of said selecting switch and to correct the selected digit by the operation of said correcting switch. Said circuit means further includes means for selectively actuating the selected digits so as to provide a visual indication of selection. Said visual indication of selection may constitute the flickering of the digits to be corrected.

Accordingly, it is an object of this invention to provide a time correcting apparatus for an electronic timepiece which is simple in structure and of high reliability, and whereby time correction can be readily achieved.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
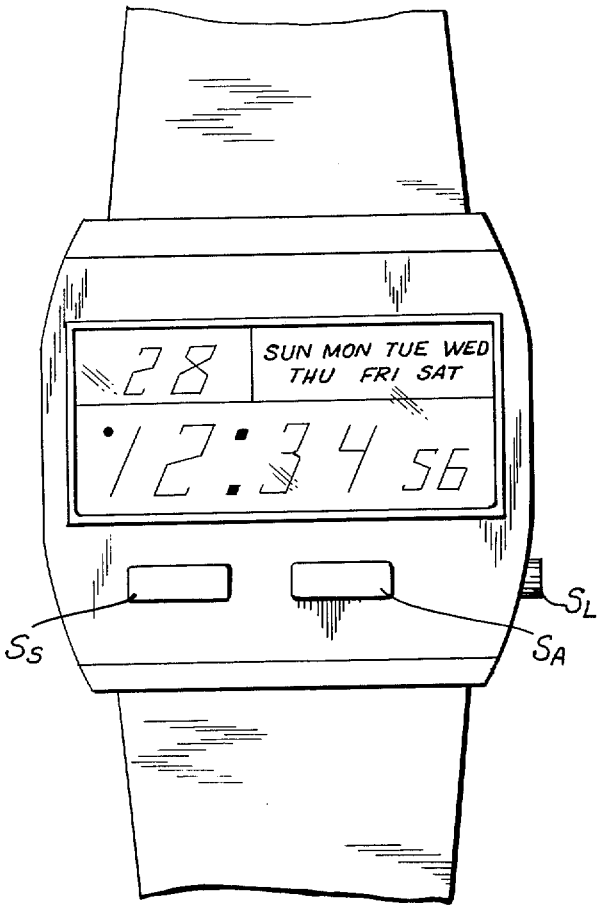
FIG. 1 is a top plan view of an electronic timepiece in accordance with the invention.

Referring now to FIG. 1, the electronic wrist watch depicted is provided for purposes of illustration with a liquid crystal display adapted to display date, day, hour, minute and second it being understood that such display could include light emitting diodes or the like. Two push buttons are mounted on the front of the case of the watch, the first, push button $S_S$ is a selecting switch for selecting the digit to be corrected. As used herein, a digit can refer to one of the two digits representative of each of the second, minute, hour and day displays, or to both of the respective digits. Further, it can refer to one of the seven days of the week, or to all of the seven days of the week. The second push button $S_A$ is a correcting switch for correcting the selected digit. Thus, in the watch of FIG. 1, the minutes digit reads "34." If the minute digit is selected by selecting switch $S_S$, the digit starts flickering or blinking. With each depression of correcting switch $S_A$, the number appearing in the minute display is indexed so as to increase by one to effect time correction. By operating selector switch $S_S$, each of the other digits of time can be selected for correction.

The watch is provided with a crown $S_L$ on the side thereof which constitutes a safety watch. When sa.. crown is pushed in, a safety circuit is actuated and push buttons $S_S$ and $S_A$ are deactivated and will not function even if pushed. In order to render the push buttons operative, the safety circuit must be released by pulling out crown $S_L$.

Figure 2:
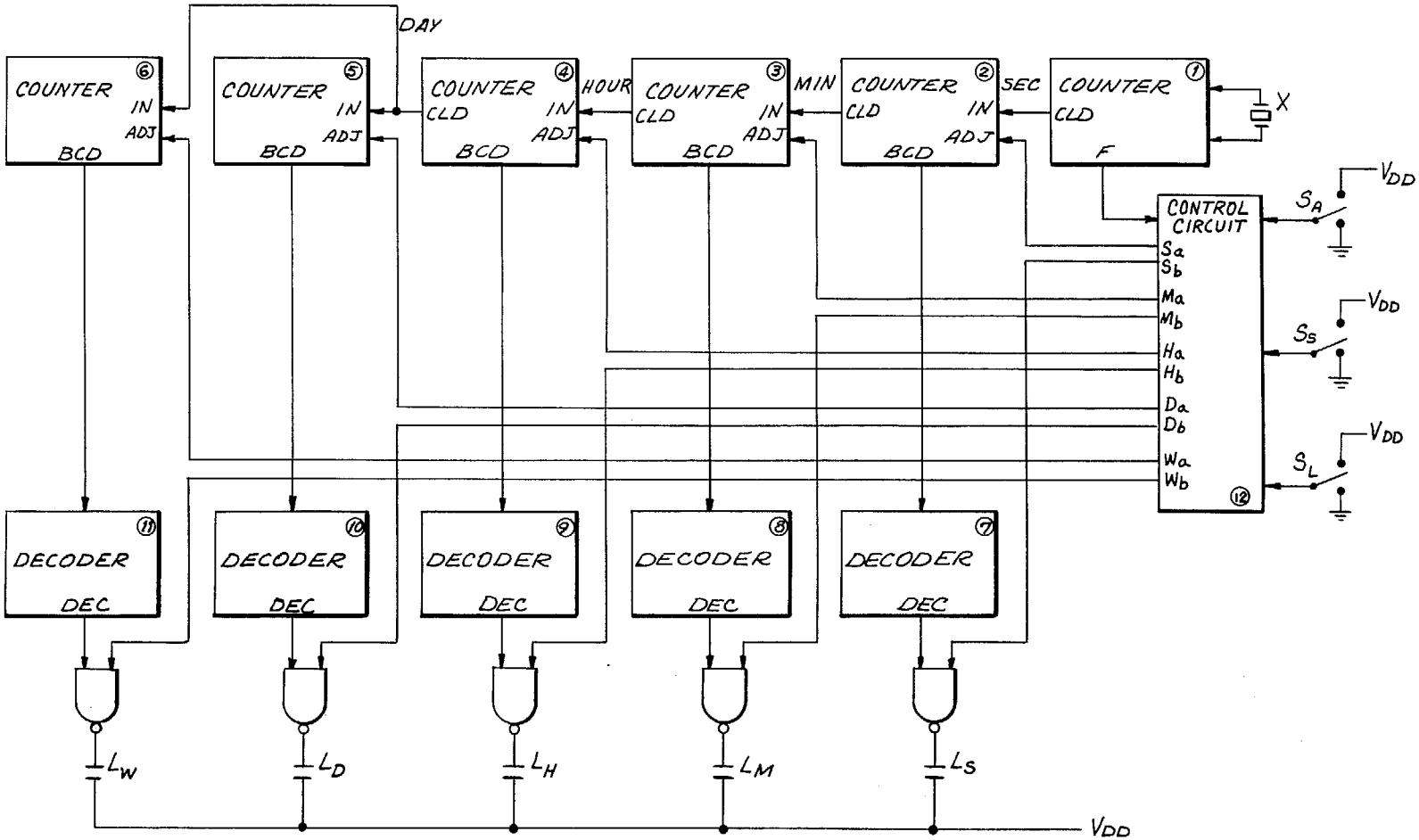
FIG. 2 is a circuit diagram of the electronic timepiece of FIG. 1.

The circuit of the electronic timepiece in accordance with the invention is shown in the block diagram of FIG. 2, wherein the high frequency time standard signal of a crystal oscillator X (for example 16,384 Hz) is divided by a counter chain consisting of six stages 1–6. Counter 1 divides the high frequency timing signal into a 1-second signal. Counter 2 divides the 1-second signal into a 1-minute signal, counting 60 seconds. Counter 3 divides the 1-minute signal into a 1-hour signal, counting 60 minutes. Counter 4 divides the 1-hour signal into a 1-day signal, counting 24 hours. Counter 5 divides the 1-day signal into a 1-month signal by counting 31 days. The counter 6 likewise divides the 1-day signal, but to produce a 1-week signal, counting the 7 days of the week.

A decoder 7–11 is connected to receive the BCD output signal of each of counters 2–6 to transform the BCD code signal outputs of said counters into a decimal signal DEC for actuating the corresponding liquid crystal displays representative of second ($L_S$), minute ($L_M$), hour ($L_H$), date ($L_D$) and day of the week ($L_W$). Each decoder is connected to its respective liquid crystal display through a NAND gate circuit, the other input to each of said NAND gates being from control circuit 12. Thus, output $S_b$ of control circuit 12 is coupled to the NAND gate associated with the second liquid crystal display $L_S$. In like manner, control circuit 12 outputs $M_b$, $H_b$, $D_b$, $W_b$ are respectively connected to the NAND gate associated with minute liquid crystal display $L_M$, hour liquid crystal display $L_H$, day liquid crystal display $L_D$ and day of the week liquid crystal display $L_W$. During normal operation of the watch, the outputs $S_b$, $M_b$, $H_b$, $D_b$ and $W_b$ are at a high state and the liquid crystal displays are driven normally by the decimal outputs of the respective decoders 7–11.

When safety switch $S_L$ is pulled out to permit time correction, a low frequency signal F of a frequency from 20 Hz to several Hz from counter 1 is applied through control circuit 12 to the digit selected for correction through one of output $S_b$, $M_b$, $H_b$, $D_b$ or $W_b$. For example, if the minute digit is to be corrected, the low frequency signal F is applied through circuit $M_b$ to the NAND gate between decoder 8 and liquid crystal display $L_M$ so that said liquid crystal display is switched on and off at the frequency of low frequency signal F. Since the frequency of signal F is selected so that the rate of switching of the selected liquid crystal display elements can be detected by the user's eyes, the selected display is flickered and can clearly be distinguished from the other displays which are continuously displayed.

Also during time correction, the signal applied by correcting switch $S_A$ is applied through control circuit 12 to the selected one of outputs $S_a$, $M_a$, $H_a$, $D_a$ and $W_a$ which are respectively connected to the correcting terminal ADJ of one of counters 2–6 for the selective correction of the setting of the selected digit.

Figure 3:
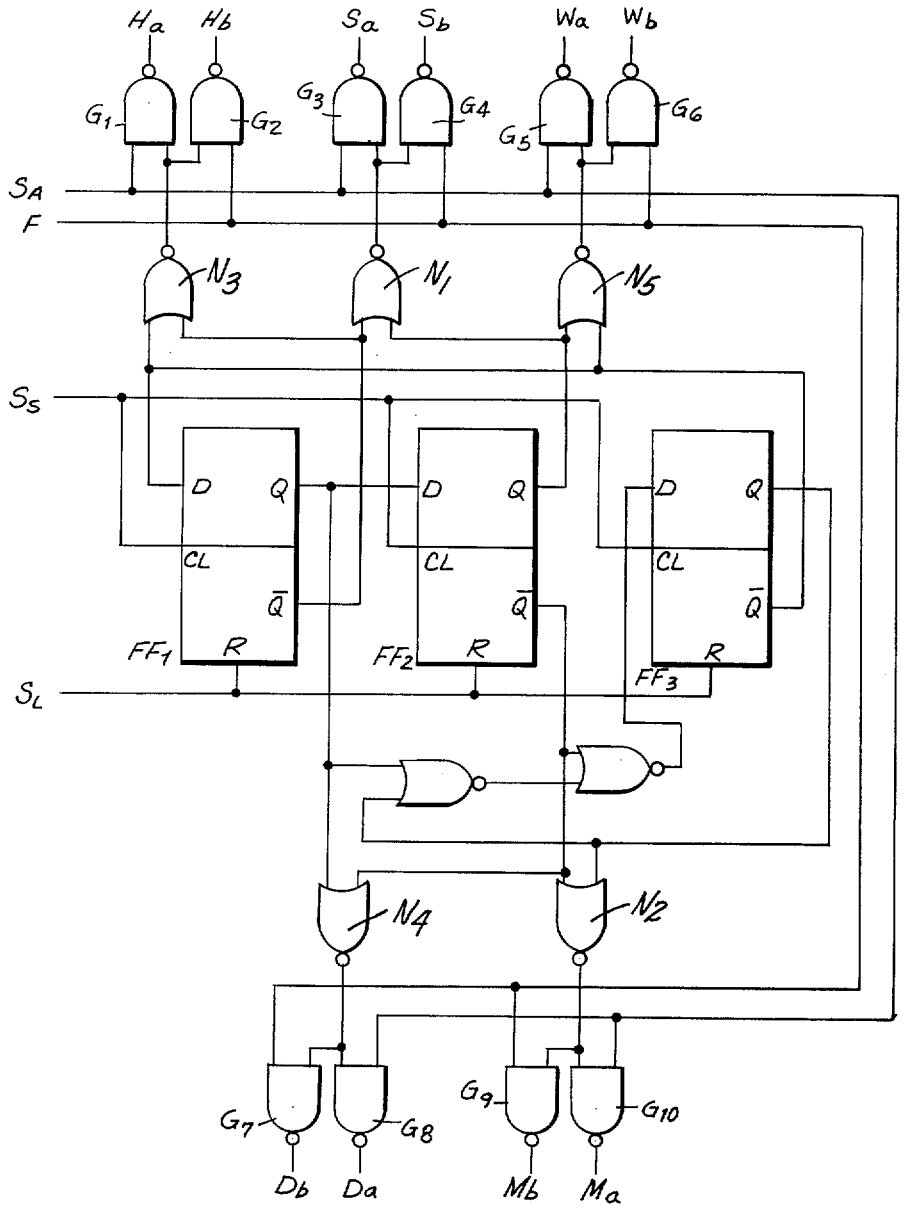
FIG. 3 is a circuit diagram of the control circuit of FIG. 2.
Figure 4:
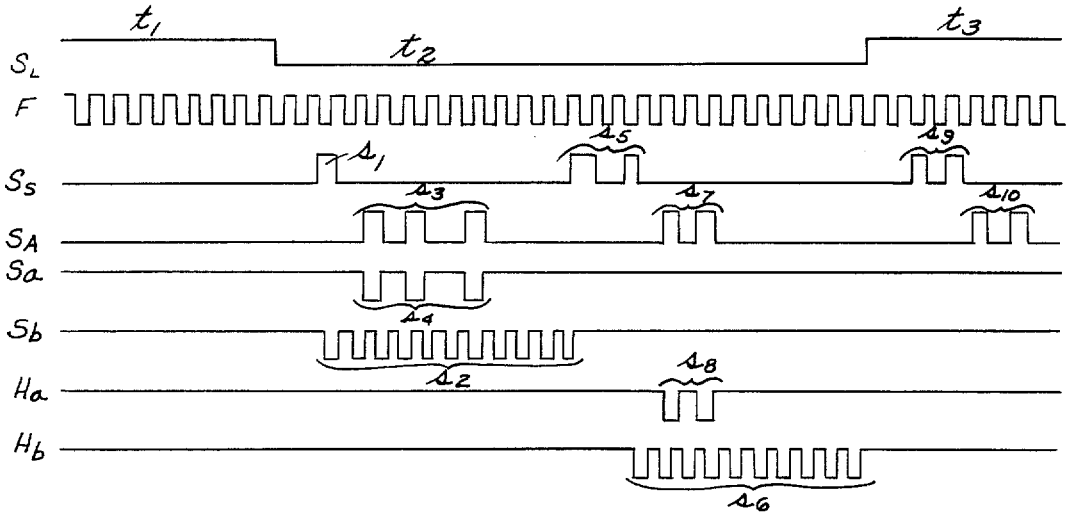
FIG. 4 is a timing chart of the circuit of FIGS. 2 and 3.

Referring to FIGS. 3 and 4, we find a circuit diagram for control circuit 12 and a timing chart for certain of the signals thereof.

Control circuit 12 includes three D-type flip-flops $FF_1$, $FF_2$ and $FF_3$ connected to form a hexadic Johnson counter. Safety switch $S_L$ is connected to the reset terminal R of the three flip-flops.

Selection switch $S_S$ is connected to input terminal CL of the three flip-flops. The outputs Q and $\overline{Q}$ of the three flip-flops are directly coupled to NOR gates $N_1$ through $N_5$. The output of NOR gates $N_1$ through $N_5$ are coupled to a control terminal of NAND gates $G_1$ through $G_{10}$ in the manner depicted. The NAND gates circuits are conventional NAND gates having the following truth tables:

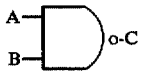

| A | B | C |
|---|---|---|
| 0 | 0 | 1 |
| | 1 | |
| 1 | 0 | 1 |
| | 1 | 0 |

| A | C |
|---|---|
| 0 | 1 |
| 1 | $\overline{B}$ |

As is understood, A is a signal for controlling the gate. B is a signal passing through the gate. As is further depicted in the second Table above, when A is 0 (zero), the gate is closed and when A is 1 the gate is open. As is further noted, when the signal B passes through the gate, a signal having the opposite phase $\overline{B}$ is obtained.

Similar NOR gates $N_1$ through $N_5$ are conventional NOR gates having a truth table as follows:

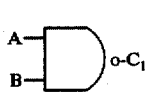

| A | B | C |
|---|---|---|
| 0 | 0 | 1 |
| | 1 | 0 |
| 1 | 0 | 0 |
| | 1 | 0 |

Finally, a D-type flip-flop is depicted in FIG. 3 has the following truth table:

| R | CL | Q | $\overline{Q}$ |
|---|---|---|---|
| 1 | * | 0 | 1 |
| 0 | ↑ | D | $\overline{D}$ |
| 0 | ↓ | Q | $\overline{Q}$ |

* Don't Care

It is noted that when CL is changed from 0 to 1, the signal applied to the D terminal is written in by Q and the complement thereof $\overline{D}$ becomes the output signal of $\overline{Q}$. Similarly, when CL is changed from 1 to 0, Q and $\overline{Q}$ are not changed.

In operation when safety switch $S_L$ is pushed in, a positive potential illustrated as t1 and t3 in FIG. 4, is applied to reset terminal R to thereby reset the flip-flops. Accordingly, NAND gates $G_1$, $G_2$, . . . $G_{10}$ are all closed, and correcting switch $S_A$ and selecting switch $S_S$ cannot be actuated. As is depicted in FIG. 4, even if $S_A$ and $S_S$ are actuated (signals $s_9$ and $s_{10}$), no changes will occur. When the crown representing safety switch $S_L$ is pulled out, a negative electrical potential is applied to reset switch R and the Johnson counter circuit is actuated, to thereby actuate selecting switch $S_S$ and to advance, the Johnson counter by one count so that one of the pairs of NAND gates $G_1$ and $G_2$, $G_3$ and $G_4$, and $G_5$ and $G_6$, $G_7$ and $G_8$, or $G_9$ and $G_{10}$ are opened while the other four pairs of NAND gates remain closed. For example, if selecting switch $S_S$ has indexed the Johnson counter so that gates $g_3$ and $g_4$ are open, the second digits are selected, in the following manner.

Switch $S_S$ is closed thus applying a pulse ($s_1$) to all three flip-flops to actuate the same and effect an opening of NAND gates $G_3$ and $G_4$ by the generating of a 1 condition at NOR gate $N_1$. The opening of NAND gates $G_3$ and $G_4$ allows signal F supplied from counter 1 to become output $S_b$ ($s_2$) of NAND gate $G_4$ and is therefore applied to display element $L_S$ causing the same to flicker. Since only display element $L_S$ is flickering, the operator can easily discern that the seconds digit is being corrected. Then, upon closing switch $S_A$ a pulse ($s_3$) is supplied by opened NAND gate $G_3$ and becomes correction signal $S_a$ ($s_4$) which is applied to the seconds counter 2 to correct the seconds time display. If it is then desired to correct the hours digit, selector switch $S_S$ is closed twice to apply two pulses ($s_5$) to the flip-flop circuits, to thereby change the state of the counter. NOR gate $N_3$ is opened, thus making the output thereof a 1 hence opening NAND gates $G_1$ and $G_2$. The opening of gate $G_2$ allows signal F to be applied through the control circuit to the digital display element $L_H$ as signal $H_b$ to effect a flickering of said display elements. Thus, a correction signal ($s_8$) is applied by correction switch $S_A$ through gate $G_1$ to hours counter 4 to thereby effect correction of the hours display. It is understood that as the selection switch $S_L$ is closed, and a pulse is applied to said control circuit 12, the digit to be corrected and the flickering of such digit is effected in the following sequence; second, minute, hour, date, day of the week, and seconds again.

By the foregoing arrangement, two switches permit the selective correction of any digit of time indication, including second, minute, hour, day and date of a digital display such as a liquid crystal display or a light emitting diode display. This structure eliminates the necessity of separate switches for each digit, thereby permitting the production of a compact electronic timepice such as a wrist watch capable of displaying a wide range of information.

While in the timepiece depicted, the liquid crystal display is driven by a DC signal, an AC signal may also be utilized to drive a liquid crystal display. In such an arrangement, the digit to be corrected would be indicated by changing the driving frequency of the digit to be corrected, for example, by providing two AC driving steps, 32 Hz and 8 Hz.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an electronic timepiece having multi-stage divider timekeeping circuit means and multi-digit display means coupled to said corresponding [multi-stage] dividers *of said timekeeping circuit means* for the digital display of time, the improvement which comprises time correcting circuit means, a manually operable selecting switch means and a manually operable correcting switch means coupled to said time correcting circuit means, said time correcting circuit means being operatively coupled to the dividers of said timekeeping circuit means associated with [the digits] *each digit* of time of said display means to be corrected for [the] [selective sequential selection of] *selectively sequentially selecting* each digit of time *to be corrected* for correction by the manual operation of said selecting switch *means* and for the selective correction of [said] *a* selected digit of time by the manual operation of said correcting switch *means*, said time correction circuit means being further coupled to *at least* each digit of time of said display means *to be corrected* and adapted to dispose [the] *each* selected [digits] *digit* of time of said digital display means *to be corrected* so as to render same *visually* distinguishable from the other digits of said display means.

2. An electronic timepiece as recited in claim 1, including safety switch means operatively coupled to said time correcting circuit means and manually operable for the selective actuation of said time correcting means, whereby said selecting switch means and said correcting switch means are operable only upon actuation of said time correcting circuit means by said safety switch means.

3. An electronic timepiece as recited in claim 1, wherein said time correcting circuit means includes a plurality of gate means defining outputs of said correcting circuit means, one of said gate means being operatively coupled to each of the divider stages producing said time-keeping signals, said correcting switch means being operatively coupled to each of said gate means for the application of a correcting signal thereto, said time correcting circuit means further including counter means having a plurality of outputs representing the sequential count of said counter means, one of said counter means outputs being connected to each of said gate means for the sequential actuation thereof to enable the actuated gate means to pass said correcting signal, said selecting switch means being operatively coupled to said counter means for the sequential indexing of said counter means.

4. An electronic timepiece as recited in claim, 3, including a further gate means associated with each of said first-mentioned gate means of said time correcting circuit means, each of said further gate means being operatively coupled to the same output of said counter means as the associated first-mentioned gate means for simultaneous actuation thereof, one of the dividers of said time keeping means supplying a display identification signal through said counter means to each of said further gate means, each of said further gate means being operatively coupled to the digits of said display means associated with the divider stage to which the associated first-mentioned gate means is connected to render such digit visually distinguishable from the other digits of said display means.

5. An electronic timepiece as recited in claim 4, including decoder means coupled to each of the dividers of said time keeping circuit means, and NAND gate means intermediate each of said decoder means and the associated display means, said NAND gate means having a first input from said decoder means and a second input from said time correcting signal means for receipt of said identification signal.

6. An electronic timepiece as recited in claim 5, wherein said identification signal is derived from an output of one of said divider stages selected to produce a low-frequency identification signal for application to each of said further gate means for transmittal to the selected NAND gate means.

7. An electronic timepiece as recited in claim 4, including safety switch means manually operable and operatively connected to said counter means for the selective enabling of the operation of said counter means to permit time correction.

8. An electronic timepiece as recited in claim 1, wherein the digits of time to be corrected include seconds, minutes and hours.

9. An electronic timepiece as recited in claim 1, wherein the digits of time to be corrected include minute, hour, day and date.

10. An electronic timepiece as recited in claim 1, wherein said time correcting circuit means is adapted to render the selected digit of said display means visually distinguishable by flickering said selected digits of said display means.

11. An electronic timepiece as recited in claim 1, wherein said display means are liquid crystal display means.

12. An electronic timepiece as recited in claim 1, wherein said display means are light emitting diode display means.

* * * * *